(12) United States Patent
Riazi et al.

(10) Patent No.: US 7,359,312 B2
(45) Date of Patent: Apr. 15, 2008

(54) METHOD AND APPARATUS FOR IDENTIFYING AN ORTHOGONAL FREQUENCY DIVISION MULTIPLEXING (OFDM) TERRESTRIAL REPEATER USING INACTIVE SUB-CARRIERS

(75) Inventors: Habib Riazi, Stafford, VA (US); Zulfiquar Sayeed, East Windsor, NJ (US); Dunmin Zheng, Vienna, VA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/763,595

(22) Filed: Jan. 23, 2004

(65) Prior Publication Data

US 2004/0151255 A1    Aug. 5, 2004

Related U.S. Application Data

(63) Continuation of application No. 09/398,503, filed on Sep. 17, 1999, now abandoned.

(51) Int. Cl.
*H04J 11/00* (2006.01)

(52) U.S. Cl. .................................... 370/208

(58) Field of Classification Search ........ 370/203–205, 370/208, 210, 281, 344, 436, 478, 480, 481, 370/319, 528; 455/66, 143, 137, 139, 192.1, 455/273, 275, 11.1, 17

See application file for complete search history.

(56) References Cited

U.S. PATENT DOCUMENTS

| | | |
|---|---|---|
| 5,487,069 A | 1/1996 | O'Sullivan et al. |
| 5,544,198 A | 8/1996 | Saalfrank |
| 5,726,978 A | 3/1998 | Frodigh et al. |
| 5,796,785 A * | 8/1998 | Spiero .................. 375/316 |

(Continued)

FOREIGN PATENT DOCUMENTS

EP    0 902 563 A1    3/1999

(Continued)

*Primary Examiner*—Wing Chan
*Assistant Examiner*—Duc Duong

(57) ABSTRACT

A terrestrial repeater is disclosed for use in a satellite transmission system that may also include a plurality of satellites. The terrestrial repeaters are implemented as OFDM transmitters to minimize the channel impairments caused by multi-path propagation. The OFDM terrestrial repeaters differentially encode the transmitted signal over frequency, as opposed to time, in order to avoid channel phase distortion. The OFDM receiver allocates two unmodulated sub-carriers as pilot bins and thereby provides two sub-carriers as a reference within each OFDM symbol. At the OFDM receiver, the two unmodulated pilot bins contain no phase information and provide a reference for the differential demodulation performed by the OFDM receiver. The OFDM transmitter operates in two modes, namely, a normal mode and a transmitter identifier information (TII) mode. The TII mode contains all of the functions of the normal mode, and also transmits a repeater identification signal with the customer data, using the inactive OFDM sub-carriers (bins). In a normal mode, the OFDM transmitter optionally fills unused (inactive) sub-carriers with zeroes and in a TII mode, the OFDM transmitter uses at least some of the unused (inactive) sub-carriers to transmit the transmitter identifier information (TII). The predefined TII value is mapped onto a set of complex symbols. The TII signal facilitates the receiver test equipment in associating the received signal with the terrestrial repeater(s) that generate the TII signal.

30 Claims, 4 Drawing Sheets

U.S. PATENT DOCUMENTS

| | | | |
|---|---|---|---|
| 5,946,293 A | 8/1999 | Beale et al. | |
| 6,072,769 A | 6/2000 | Ho | |
| 6,134,267 A * | 10/2000 | Schafer et al. | 375/224 |
| 6,175,550 B1 | 1/2001 | van Nee | |
| 6,456,653 B1 * | 9/2002 | Sayeed | 375/227 |

FOREIGN PATENT DOCUMENTS

| | | |
|---|---|---|
| GB | 2 261 142 A | 5/1993 |
| JP | H10-200458 | 7/1998 |
| JP | H11-215095 | 7/1999 |

\* cited by examiner

FREQUENCY INTERLEAVER ENTRY MATRIX (300)

|        | COL 0 | COL 1 | COL 2 | ... | COL 29 | COL 30 | COL 31 |
|--------|-------|-------|-------|-----|--------|--------|--------|
| ROW 0  | I0    | I1    | I2    | ... | I29    | I30    | I31    |
| ROW 1  | I32   | I33   | I34   | ... | I61    | I62    | I63    |
| ROW 2  | I64   | I65   | I66   | ... | I93    | I94    | I95    |
| ⋮      | ⋮     | ⋮     | ⋮     | ... | ⋮      | ⋮      | ⋮      |
| ROW 31 | I960  | I961  | I962  | ... | Q13    | Q14    | Q15    |
| ROW 32 | Q16   | Q17   | Q18   | ... | Q45    | Q46    | Q47    |
| ⋮      | ⋮     | ⋮     | ⋮     | ... | ⋮      | ⋮      | ⋮      |
| ROW 59 | Q912  | Q913  | Q914  | ... | Q941   | Q942   | Q943   |
| ROW 60 | Q944  | Q945  | Q946  | ... | Q973   | Q974   | Q975   |

METHOD AND APPARATUS FOR IDENTIFYING AN ORTHOGONAL FREQUENCY DIVISION MULTIPLEXING (OFDM) TERRESTRIAL REPEATER USING INACTIVE SUB-CARRIERS

CROSS REFERENCE TO RELATED APPLICATIONS

This application is a continuation of U.S. patent application Ser. No. 09/398,503, filed on Sep. 17, 1999 now abandoned.

FIELD OF THE INVENTION

The present invention relates generally to satellite broadcasting systems, and more particularly, to terrestrial repeaters in such satellite broadcasting systems.

BACKGROUND OF THE INVENTION

Satellite broadcasting systems for transmitting programming content have become increasingly popular in many parts of the world. Direct Broadcasting Satellite (DBS) systems transmit television programming content, for example, to a geo-stationary satellite, which broadcasts the content back to the customers. In such a wireless broadcast environment, the transmitted programming can be received by anyone with an appropriate receiver, such as an antenna or a satellite dish.

In addition, a number of satellite broadcasting systems have been proposed or suggested for broadcasting audio programming content from geo-stationary satellites to customers in a large coverage area, such as the continental United States. Proposed systems for providing digital audio broadcasting (DAB), for example, are expected to provide near CD-quality audio, data services and more robust coverage than existing analog FM transmissions. Satellite broadcasting systems for television and radio content provide potentially national coverage areas, and thus improve over conventional terrestrial television stations and AM/FM radio stations that provide only regional coverage.

Satellite broadcasting systems transmits digital music and other audio information from an uplink station to one or more mobile receivers. Satellite broadcasting systems typically include a plurality of satellites and terrestrial repeaters operating in a broadcast mode. The satellites are typically geo-stationary, and are located over a desired geographical coverage area. The terrestrial repeaters typically operate in dense urban areas, where the direct line of sight (LOS) between the satellites and the mobile receiver can be blocked due to the angle of elevation and shadowing by tall buildings.

Many digital audio broadcasting systems utilize a transmitter identifier information signal to permit test equipment to associate the received signal with any terrestrial repeater(s) that generate the TII signal. The European digital audio broadcasting standard, for example, set forth in "Radio Broadcasting Systems: Digital Audio Broadcasting to Mobile, Portable and Fixed Receivers," European Telecommunications Standard: ETS 300 401 (May 1997), provides synchronization, null and data symbols as part of the OFDM signal. Under the European digital audio broadcasting standard, the TII signal is transmitted in the active bandwidth using dedicated synchronization symbols that are multiplexed in time with the user data. A need exists for a method and apparatus for transmitting a TII signal with reduced overhead and increased capacity. A further need therefore exists for a method and apparatus for transmitting a TII signal that optionally makes the TII information available in all symbols.

SUMMARY OF THE INVENTION

Generally, a terrestrial repeater is disclosed for use in a satellite transmission system that broadcasts programming content, such as audio and video information. The satellite transmission system may also include a plurality of satellites. According to one aspect of the invention, the terrestrial repeaters are implemented as OFDM transmitters to minimize the channel impairments caused by multi-path propagation. According to another aspect of the invention, the OFDM terrestrial repeaters differentially encode the transmitted signal over frequency, as opposed to time. Thus, the differential encoding is performed with respect to consecutive bins (sub-carriers) in the OFDM system in order to avoid channel phase distortion.

The OFDM receiver allocates a number of unmodulated sub-carriers as pilot bins and thereby provides such unmodulated sub-carriers as a reference within each OFDM symbol. At the OFDM receiver, the unmodulated pilot bins contain no phase information. Thus, the unmodulated pilot bins provide a reference for the differential demodulation performed by the OFDM receiver.

According to yet another aspect of the present invention, the OFDM transmitter operates in two modes, namely, a normal mode and a transmitter identifier information mode. The TII mode contains all of the functions of the normal mode, and also transmits a repeater identification signal with the customer data, using the inactive OFDM sub-carriers (bins). Thus, the OFDM transmitter can continuously or periodically transmit an identifying signal that can be used, for example, during a testing phase.

In a normal mode, the OFDM transmitter optionally fills unused (inactive) sub-carriers with zeroes and in a TII mode, the OFDM transmitter uses at least some of the unused (inactive) sub-carriers to transmit the transmitter identifier information. In a TII mode, additional sub-carriers will be turned on/off in accordance with a predefined TII value. If the TII sub-carriers continuously transmit the non-varying TII value, it may be performed at reduced power. The predefined TII value is mapped onto a set of complex symbols. The TII signal facilitates the receiver test equipment in associating the received signal with the terrestrial repeater(s) that generate the TII signal.

A more complete understanding of the present invention, as well as further features and advantages of the present invention, will be obtained by reference to the following detailed description and drawings.

BRIEF DESCRIPTION OF THE DRAWINGS

FIG. 3 is a table containing a sample record from an entry matrix utilized by the frequency interleaver of FIG. 2.

DETAILED DESCRIPTION

Figure 1:
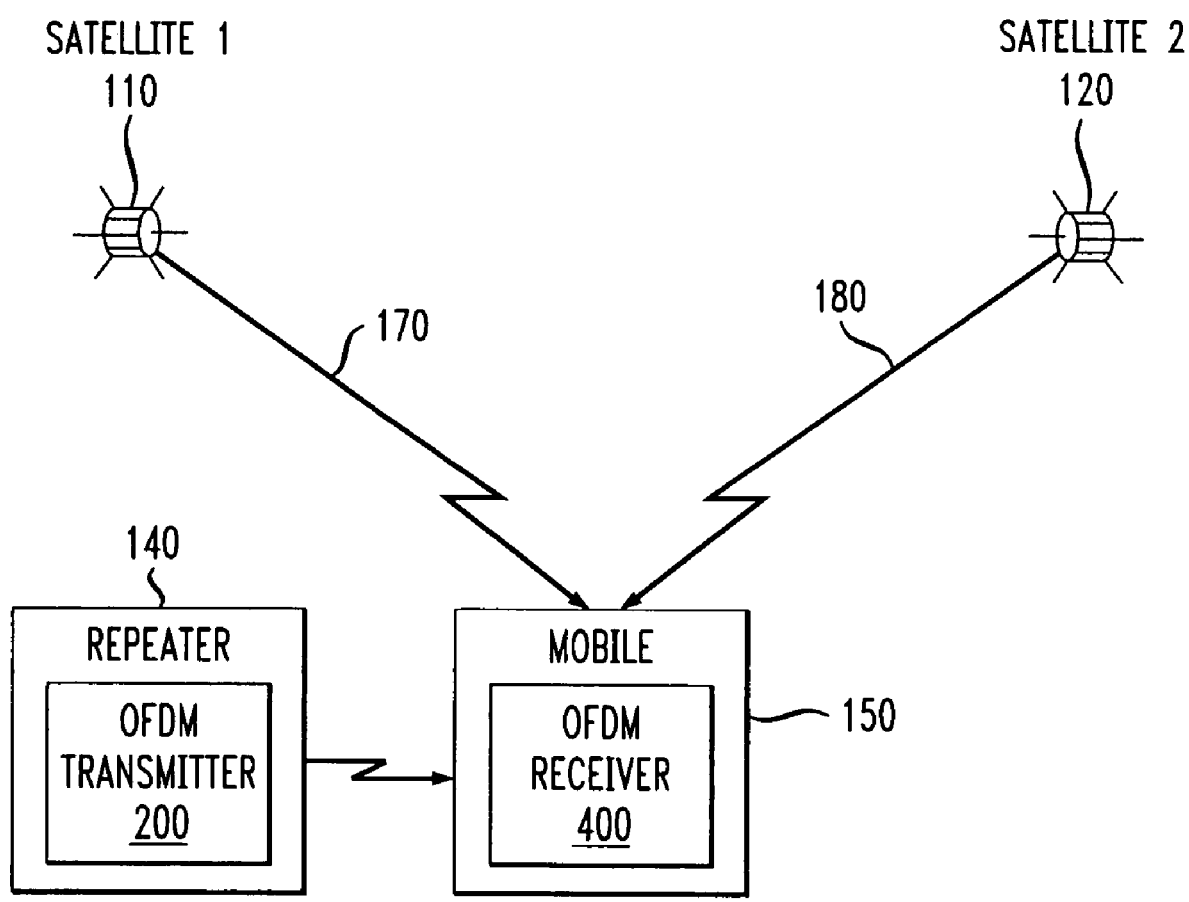
FIG. 1 illustrates a satellite transmission system where the present invention can operate.

FIG. 1 illustrates a satellite transmission system 100 in accordance with the present invention. The satellite transmission system 100 transmits digital music and other audio information from an up-link station (not shown) to one or more mobile receivers, such as the mobile receiver 150. As shown in FIG. 1, the illustrative satellite transmission system 100 includes two satellites 110, 120 operating in a broadcast mode. The satellites 110, 120 are designed to be geo-stationary, and are located over a desired geographical coverage area, such as over the eastern and western United States, at appropriate angles of elevation, as dictated by the requirements of a geo-stationary system. In one embodiment, the satellites 110, 120 are implemented as conventional time division multiplexed (TDM) transmitters.

In addition, the satellite transmission system 100 includes a plurality of terrestrial repeaters, such as the terrestrial repeater 140, discussed below, that will operate in dense urban areas, where the direct line of sight between the satellites 110, 120 and the mobile receiver 150, can be blocked due to the angle of elevation and shadowing by tall buildings. According to a feature of the present invention, the terrestrial repeaters 140 are implemented as OFDM transmitters to minimize the channel impairments caused by multi-path propagation. In addition, the OFDM terrestrial repeaters 140 can differentially encode the transmitted signal over frequency, as opposed to time. Thus, the differential encoding is performed with respect to consecutive bins (sub-carriers) in the OFDM system bins in order to avoid channel phase distortion.

The OFDM terrestrial repeater 140 generally differentially encodes the transmitted signal over frequency when the channel exhibits phase coherence (the channel phase from one differentially modulated symbol to the next does not change much). In the illustrative DQPSK implementation, the consecutive channel phases should vary by less than 45/2 degrees. In a channel environment where the channel phase variations are more over frequency than over time, the terrestrial repeater 140 may implement a conventional mechanism that differentially encodes over time.

According to another feature of the present invention, the OFDM transmitter 200 can operate in two modes, namely, a normal mode and a TII mode. As discussed further below, the TII mode contains all of the functions of the normal mode, and in addition transmits a repeater identification signal with the customer data, using the inactive OFDM sub-carriers (bins).

The satellites 110, 120 receive the broadcast signal from a studio, over a robust radio frequency (RF) link, and the satellites 110, 120 will broadcast the signal after down-converting the signal to the carrier frequency. The terrestrial repeaters 140 retrieve the information directly from an up-link studio (not shown), using well-known technical means, such as wireline or microwave links, or from a dedicated satellite (not shown). In the illustrative implementation, the terrestrial repeaters 140 receive the information directly from the studio.

OFDM Signal

In the illustrative embodiment, each OFDM symbol of duration Ts will be composed of 978 active bins (sub-carriers) equally spaced, at a carrier spacing of 4 kHz (Δf). The duration of the symbol, Ts, is 266.11 mu-sec, where Ts equals Tu plus Tg. The useful OFDM symbol duration, Tu, illustratively equals 250 mu-sec and is, and the guard interval duration or cyclic prefix duration, Tg, illustratively equals 16.11 mu-sec. The inter-carrier spacing, Δf, of 4 KHz is equal to the inverse of the useful symbol duration (1/Tu). The main signal is defined as follows:

$$s(t) = \mathrm{Re}\left\{\sum_{l=-\infty}^{\infty}\left(\sum_{k=-489}^{489} z(l,k) \times g(t-lTs,l,k) + \sum_{k=-511}^{-490} m(533+k)g(t-lTs,l,k) + \sum_{k=490}^{511} m(k-490)g(t-lTs,l,k)\right)\right\}$$

where, $z(l,k)$ equals the differentially coded complex symbol for to the kth sub-carrier in the lth OFDM symbol for k!=0 and 0 for k=0;

$m(k)$ equals the complex TII information (transmitted only in the TII mode, 0 in normal mode);

$g(t, l, k)=\exp(j*2*\pi*k*(t-Tg)/Tu)*\mathrm{rect}(t/Ts)$ for all l;

$\mathrm{rect}(x)=1$ for $0<=x<1$ or 0 otherwise. In addition, where the Factor equals two (2), T is defined as (1/(2048*4000)) (approximately 122.07 ns); Tg is defined as approximately 16.11 mu-sec (=132T); Tu is defined as 250 mu-sec=2048T and Ts is defined as approximately 266.11 mu-sec (=2180T).

OFDM Transmitter

Figure 2:
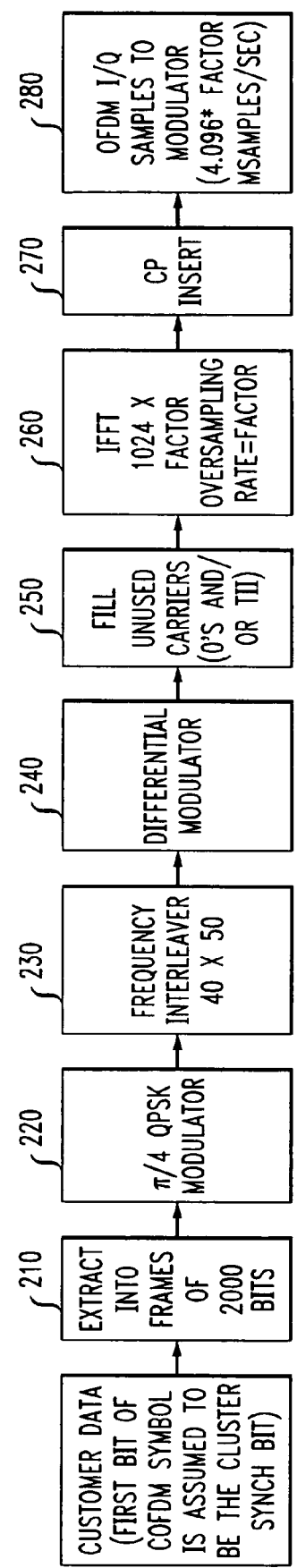
FIG. 2 illustrates the OFDM transmitter of FIG. 1 in accordance with the present invention.

FIG. 2 illustrates the OFDM baseband transmitter 200 in accordance with the present invention. The studio encoder (not shown) supplies the transmitter 200 with the bits to be transmitted. These bits have been source and channel encoded, interleaved and presented to the OFDM transmitter 200.

As shown in FIG. 2, the OFDM transmitter 200 includes a block 210 that collects the input data stream into frames of 1952 bits. In one implementation, the customer data is arranged into blocks of 2000 bits such that the first bit of the frame serves as a synchronization bit. Therefore, the OFDM transmitter 200 will have to extract the framing of the OFDM frame with the proper assignment of the first bit to the cluster synchronization bit. The selection of the cluster synchronization bit value (1 or 0) is not a function of the OFDM signal generator. These 1952 bits will correspond to the 1952 bits belonging to one OFDM symbol. In the illustrative embodiment, the time duration of one 1952-bit-frame is 266.11 mu-sec (microseconds), of which 250 mu-sec will be assigned to the useful OFDM symbol, and 16.11 mu-sec to the guard interval or cyclic prefix (CP).

Following framing, the incoming bits are then mapped into a π/4 shifted QPSK constellation by a π/4 QPSK modulator 220. In other words, the input bit-stream is mapped into a stream of complex QPSK constellation points, such that the output lies on the complex unit circle, and the points are shifted by π/4 from the axes. The exact operations are:

Input: Bit stream {p0, p1, . . . p1951}
where p(i)=0 or 1
Output: complex symbols {q0, q1, . . . p1951}
where q(i)=Complex float: lying on the unit circle at π/4, 3π/4, 5π/4, 7π/4 $q(n)=(1/\mathrm{sqrt}(2))*[(1-2*p(2n))+j*(1-2*p(2n+1))]$ for n=0, 1, . . . 975.

The QPSK-mapped stream is then frequency interleaved by an interleaver 230. The OFDM signal contains information in both the time and frequency domains. The OFDM transmitter 200 generates a signal that has 976 sub-carriers plus 2 unmodulated pilots and a nulled sub-carrier, each with 4 kHz separation between sub-carriers. The channel that distorts the signal varies in both time and frequency. The time variations, due to the motion of the receiver 400 relative to the transmitter 200, are taken advantage of by the time interleaver (not shown) of the encoder block. The frequency variations, due to the delay spread of the channel, is taken advantage of by the frequency interleaver 230. The channel would present correlated fading to nearby sub-carriers, and will decorrelate from itself at a frequency separation equal to approximately the inverse of the delay spread of the channel. The following describes the OFDM frequency interleaver in detail:

Input: {q0, q1, q2, ... q975} where q(i)=complex QPSK symbols

Output: {y0, y1, ... y975} where y(i)=complex QPSK symbols

Let q(i) be represented as I(i)+jQ(i);

arrange the complex stream {q0, q1, ... q975} as:

B: I0 I1 I2 ... I975 Q0 Q1 ... Q975, as a 1952 sample wide buffer.

This stream will be interleaved using a 61 by 32 block interleaver, such that the buffer, B, is written to a matrix row by row and the output, T, is read out from the matrix column by column. The entry matrix 300 when fully occupied is shown in FIG. 3.

Therefore, the output, T, equals {t0, t1, ... t1951}, which can be expressed as follows:

{I0, I32, I64, ..., I960, Q16, ..., Q912, Q944, I1, I33, I65, ..., I961,Q17 ... Q913,Q946 ... I31, I63, ... Q15, Q47, ... Q943, Q975}, where the leftmost entry of the stream is the oldest sample out of the interleaver 230. The stream T is then de-multiplexed such that:

$y(0)=t0+j*t1$ $y(1)=t2+j*t3$

...

$y(975)=t1950+j*t1951$

The stream of complex samples {y0, y1, ... y975} denotes the output of the frequency interleaver 230.

As previously indicated, the OFDM terrestrial repeater 140 differentially encodes the transmitted signal over frequency, as opposed to time. Thus, a differential modulator 240 differential encodes the interleaved data with respect to consecutive bins (sub-carriers) in the OFDM system. At the receiver 400, the 489th sub-carrier will contain no phase information. Also by the structure of the IFFT buffering, discussed below, the $1^{st}$ sub-carrier will also be devoid of any phase information. Therefore, the differential modulator 240 initiates the encoder memory with phase π/4 every 489th received complex sample. It is noted that the unmodulated pilot bins provide a reference for the differential demodulation. Thus, the OFDM transmitter 200 provides, for example, two sub-carriers as a reference within each OFDM symbol. The following details the operations of the differential modulator 240:

Input={y0, y1, ... y975} where y(i)=complex

Output={z0, z1, ... z1955} where z(i)=complex

The differential modulator 240 operates as follows. Initially, the input is arranged such that:

$t_0 = (1/sqrt2, 1/sqrt2)$ $t_1 = y0$ $t_2 = y1$

...

$t_{488} = y487$ $t_{489} = (1/sqrt2, 1/sqrt2)$ $t_{490} = y488$ $t_{491} = y489$

...

$t_{977} = y975$

The values 1/sqrt(2) and 1/sqrt(2) are to be pilot tones at the beginning k=−489 and the middle (k=1) of the spectrum. Thereafter, the output values, z(i), of the differential modulator 240 are generated using complex multiplication as follows:

$z(0)=t(0)$ $z(1)=t(1)*z(0)$ $z(2)=t(2)*z(1)$

...

$z(488)=t(488)*z(487)$ $z(489)=t(489)$ $z(490)=t(490)*z(489)$

...

$z(977)=t(977)*z(976)$

As shown in FIG. 2, block 250 fills unused (inactive) carriers with zeroes (in a normal mode) or with transmitter identifier information (TII) (in a TII mode). In a TII mode, additional sub-carriers will be turned on/off. The on/off is governed by a repeater identification number $b_0, b_1, \ldots b_{43}$, which is a 44 bit number, and is mapped onto complex symbols $m_0 m_1 \ldots m_{43}$. The TII signal facilitates the receiver test equipment in associating the received signal with the terrestrial repeater(s) that generate the TII signal. The illustrative TII is capable of identifying at most $2^{44}$ repeaters. Due to considerations of limiting interference to TDM bands associated with the satellites 110, 120, a subset of these numbers may be properly selected.

The TII number is specified as $b_0, b_1, \ldots b_{43}$, where b(i) can be 0 or 1. The mapping of the bits b(i) to m(i) may be performed as follows:

$m(i) = 1/\text{sqrt}(2) + j*1/\text{sqrt}(2); \quad \text{if } b(i) = 1, \text{ or}$ $\quad\quad = 0; \quad\quad\quad\quad\quad\quad\quad\quad \text{if } b(i) = 0.$ In a normal mode, all m(i) will be zero.

The differentially encoded data is passed to an IFFT block 260 that creates the OFDM signal. In the illustrative implementation, a factor of 2 oversampling is used, requiring the IFFT 260 to have a length of 2048. Generally, an implementation may require higher oversampling by a factor, Factor, which will then necessitate a 1024*Factor IFFT. To ensure that the highest frequency sub-carriers are reproduced without aliasing the IFFT 260 must be made twice as large as the number of active sub-carriers. It is noted that the value of Factor must at-least be 2.

The buffering of the 1024×Factor long buffer is designed to accommodate 978 sub-carriers (1022 in TII Mode), such that the $0^{th}$ location of the buffer will contain the nulled sub-carrier (required for acquisition purposes) and then the next 489 samples will occupy the next consecutive locations. The last 489 locations of the buffer is filled with the latter half of the incoming 978 samples. The rest of the buffer is filled with zero's at block 250. To visualize, this IFFT arrangement will produce the positive frequency components (relative to the carrier at 2.9 GHz) with the first 489 samples coming in, the negative frequency components with the latter 489 samples that come in, and the central carrier (the carrier at 2.9 GHz) being nulled. In the TII Mode additional sub-carriers are turned on/off.

The details of the block 250 are as follow:

Input={z0, z1, . . . z977} where z(i)=complex

Output={f0, f1, f2, . . . f(Factor*1024−1)} where f(i)= complex (an oversampling rate of Factor is assumed).

Arrange z(n) {n=0, . . . 977} such that:

The central null is established as follows:

$f(0)=(0,0);$

The sub-carriers are established as follows:

| first half | latter half |
|---|---|
| f(1) = z(0); | f(1024 × Factor − 489) = z(489) |
| . | |
| . | |
| . | |
| f(488) = z(487); | f(1024 × Factor − 2) = z(976) |
| f(489) = z(488). | f(1024 × Factor − 1) = z(977) |

The TII signal is established as follows:

| first half | latter half |
|---|---|
| f(490) = m(0); | f(1024 × Factor − 511) = m(22) |
| f(491) = m(1); | f(1024 × Factor − 491) = m(42) |
| . | |
| . | |
| . | |
| f(511) = m(21). | f(1024 × Factor − 490) = m(43). |

Inactive carriers are set to zero, as follows:

$f(512)=(0,0);$

. . .

$f(1024×Factor−512)=(0,0).$

The operation of the IFFT block 260 can be expressed as follows:

Input={f0, f1, . . . f(1024×Factor−1)}, where f(i)=complex

Output={a0, a1, a2, . . . a(1024×Factor−1)}, where a(i) is complex and belongs to the complex plane and does not lie on a grid. The IFFT block 260 generates a Complex to Complex Inverse FFT and generates an output in I/Q format. For a more detailed discussion of the IFFT block 260, see, for example, W. H. Press et al., Numerical Recipes in C—The Art of Scientific Computing, Cambridge University Press, Cambridge (1991), incorporated by reference herein.

A cyclic prefix is added to the signal at block 270 to mitigate the effects of the channel and inter-repeater delay spreads. The operation of the CP block 270 can be expressed as follows:

Input={a0, a1, a2 . . . a(Factor×1024−1)} where a(i)= complex

Output={A0, A1, A2, . . . A((1024+GI)×Factor−1)} where A(i)=complex

It is noted that GI is set to 66 samples, and oversampling of Factor is assumed for OFDM signal generation. Factor must at-least be 2. This creates a cyclic prefix of 16.11 mu-sec, slightly larger than design. The number of samples in the cyclic prefix is GI×Factor. The CP block 270 simply takes the last GI×Factor samples of the incoming 1024×Factor samples, and repeats these samples at the beginning of the (1024+GI)×Factor buffer. The latter part of the buffer is then filled with the incoming 1024×Factor samples.

As previously indicated, the transmitter 200 runs at two times oversampling, in the illustrative embodiment, which produces a I/Q sample stream at the transmitter output 280 at a rate of 4.096*Factor Msamples/sec in both the I and Q rails.

For a detailed discussion of a conventional orthogonal frequency division multiplexing (OFDM) system, see, for example, W. Y. Zou and Y. Wu, "COFDM—An Overview," IEEE Trans. Broadcasting, Vol. 41, No. 1, 1-8 (March 1995) or J. A. C. Bingham, "Multicarrier Modulation for Data Transmission: An Idea Whose Time Has Come," IEEE Comm., 5-14 (May 1990), each incorporated by reference herein.

OFDM Receiver

Figure 4:
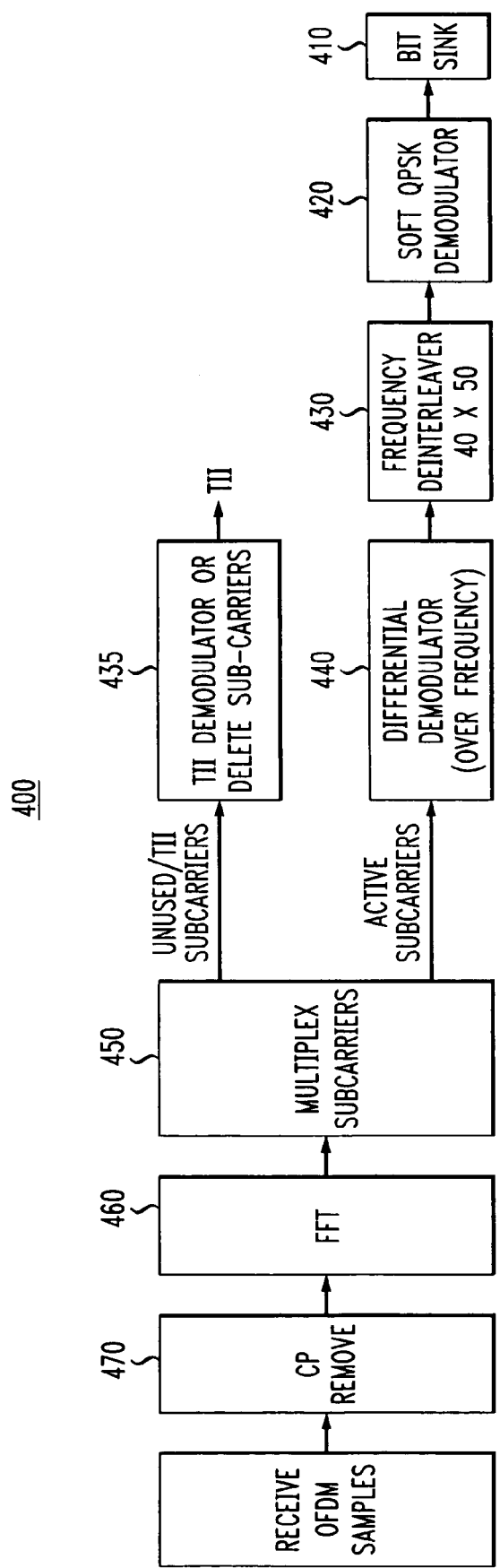
FIG. 4 illustrates the OFDM receiver of FIG. 1.

FIG. 4 shows an exemplary OFDM receiver 400 in accordance with the present invention. The OFDM receiver 400 contains elements 470, 460, 450, 440 and 430 that perform the inverse function of the corresponding element in the OFDM transmitter 200, in a manner well-known to those skilled in the art. The elements 470, 460, 450, 440 and 430 in the OFDM receiver 400 are operative once the timing and frequency offset have been acquired, in a manner well-known to those skilled in the art.

According to one feature of the present invention, the OFDM receiver 400 also operates in two modes, namely, a normal mode and a transmitter identifier information mode. As shown in FIG. 4, block 450 multiplexes the sub-carriers to separate the TII/unused bins from the active, data-carrying bins. The TII/unused bins are processed by a TII demodulator 435 to process the TII information or to discard the unused sub-carriers. The active, data-carrying bins are processed by the differential demodulator 440 (over frequency), frequency de-interleaver 430, QPSK demodulator 420 and a bit sink 410.

It is to be understood that the embodiments and variations shown and described herein are merely illustrative of the principles of this invention and that various modifications may be implemented by those skilled in the art without departing from the scope and spirit of the invention.

We claim:

1. A method of transmitting an identifying signal in an orthogonal frequency division multiplexing system, comprising the steps of:

modulating said signal;

transforming said modulated signal to create an OFDM signal having a plurality of sub-carriers wherein a first subset of said plurality of sub-carriers are allocated pursuant to a standard for transmission of information and a second subset of said plurality of sub-carriers are allocated pursuant to said standard as inactive subcarriers that do not carry information; and transmitting said identifying signal on one or more of said inactive sub-carriers for at least a portion of time, wherein said identifying signal identifies a transmitter.

2. The method of claim 1, wherein said modulation step further comprises the step of differentially modulating said identifying signal in the frequency domain.

3. The method of claim 1, wherein said inactive sub-carriers will be modulated in accordance with a predefined transmitter identifier information value.

4. The method of claim 1, wherein said inactive sub-carriers carrying said identifying signal are transmitted at a reduced power.

5. The method of claim 1, further comprising the step of mapping an identifying value of said identifying signal onto a set of complex symbols.

6. The method of claim 1, wherein said inactive sub-carriers carrying said identifying signal are transmitted with each OFDM symbol.

7. The method of claim 1, wherein said transforming step implements an Inverse Fast Fourier Transform.

8. The method of claim 1, wherein said transforming step implements an orthogonal transform.

9. An orthogonal frequency division multiplexing transmitter for transmitting an OFDM signal, comprising:

an encoder for modulating said OFDM signal;

a transformer for creating said OFDM signal having a plurality of sub-carriers wherein a first subset of said plurality of sub-carriers are allocated pursuant to a standard for transmission of information and a second subset of said plurality of sub-carriers are allocated pursuant to said standard as inactive subcarriers that do not carry information; and means for inserting an identifying signal on one or more of said inactive sub-carriers for at least a portion of time, wherein said identifying signal identifies a transmitter.

10. The transmitter of claim 9, wherein said encoder differentially modulates said OFDM signal in the frequency domain.

11. The transmitter of claim 9, wherein said inactive sub-carriers will be modulated in accordance with a predefined transmitter identifier information value.

12. The transmitter of claim 9, wherein said inactive sub-carriers carrying said identifying signal are transmitted at a reduced power.

13. The transmitter of claim 9, wherein an identifying value of said identifying signal is mapped onto a set of complex symbols.

14. The transmitter of claim 9, wherein said inactive sub-carriers carrying said identifying signal are transmitted with each OFDM symbol.

15. The transmitter of claim 9, wherein said transformer implements an Inverse Fast Fourier Transform.

16. The transmitter of claim 9, wherein said transformer implements an orthogonal transform.

17. A method of receiving an identifying signal in an orthogonal frequency division multiplexing system, comprising the steps of:

transforming said received signal to recover an OFDM signal in the frequency domain having a plurality of sub-carriers wherein a first subset of said plurality of sub-carriers are allocated pursuant to a standard for transmission of information and a second subset of said plurality of sub-carriers are allocated pursuant to said standard as inactive subcarriers that do not carry information;

decoding said OFDM signal; and processing said identifying signal received on one or more of said inactive sub-carriers for at least a portion of time, wherein said identifying signal identifies a transmitter.

18. The method of claim 17, wherein said decoding step further comprises the step of differentially demodulating said OFDM signal in the frequency domain.

19. The method of claim 17, wherein said inactive sub-carriers will be demodulated in accordance with a predefined transmitter identifier information value.

20. The method of claim 17, wherein said inactive sub-carriers carrying said identifying signal are received at a reduced power.

21. The method of claim 17, wherein said inactive sub-carriers carrying said identifying signal are received with each OFDM symbol.

22. The method of claim 17, wherein said transforming step implements a Fast Fourier Transform.

23. The method of claim 17, wherein said transforming step implements an orthogonal transform.

24. An orthogonal frequency division multiplexing receiver for receiving an OFDM signal, comprising:

a transformer for transforming said received signal to recover an OFDM signal in the frequency domain having a plurality of sub-carriers wherein a first subset of said plurality of sub-carriers are allocated pursuant to a standard for transmission of information and a second subset of said plurality of sub-carriers are allocated pursuant to said standard as inactive subcarriers that do not carry information;

a decoder for demodulating said OFDM signal; and means for processing an identifying signal received on one or more of said inactive sub-carriers for at least a portion of time, wherein said identifying signal identifies a transmitter.

25. The receiver of claim 24, wherein said decoder differentially demodulates said OFDM signal in the frequency domain.

26. The receiver of claim 24, wherein said inactive sub-carriers will be demodulated in accordance with a predefined transmitter identifier information value.

27. The receiver of claim 24, wherein said inactive sub-carriers carrying said identifying signal are received at a reduced power.

28. The receiver of claim 24, wherein said inactive sub-carriers carrying said identifying signal are received with each OFDM symbol.

29. The receiver of claim 24, wherein said transformer implements a Fast Fourier Transform.

30. The receiver of claim 24, wherein said transformer implements an orthogonal transform.

* * * * *